United States Patent
Longo et al.

(10) Patent No.: US 10,474,199 B2
(45) Date of Patent: *Nov. 12, 2019

(54) INPUT DEVICE ATTACHMENT

(71) Applicant: Microsoft Technology Licensing, LLC, Redmond, WA (US)

(72) Inventors: Thomas J. Longo, Redmond, WA (US); Andrew William Hill, Redmond, WA (US); Eugene Lee, Seattle, WA (US); James H. Wise, Valparaiso, IN (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/345,153

(22) Filed: Nov. 7, 2016

(65) Prior Publication Data

US 2017/0054834 A1    Feb. 23, 2017

Related U.S. Application Data

(63) Continuation of application No. 14/229,466, filed on Mar. 28, 2014, now Pat. No. 9,497,300.

(51) Int. Cl.
*G06F 1/16* (2006.01)
*H04M 1/02* (2006.01)
(Continued)

(52) U.S. Cl.
CPC .......... *G06F 1/1656* (2013.01); *G06F 1/162* (2013.01); *G06F 1/1654* (2013.01);
(Continued)

(58) Field of Classification Search
CPC combination set(s) only.
See application file for complete search history.

(56) References Cited

U.S. PATENT DOCUMENTS 6,798,649 B1   9/2004 Olodort
8,498,100 B1   7/2013 Whitt, III et al.
(Continued)

FOREIGN PATENT DOCUMENTS

CN    103026313 A   4/2013
CN    202916789 U   5/2013
(Continued)

OTHER PUBLICATIONS

"Final Office Action", U.S. Appl. No. 14/229,466, dated Mar. 14, 2016, 15 pages.
(Continued)

*Primary Examiner* — Zhitong Chen
(74) *Attorney, Agent, or Firm* — Rainier Patents, P.S.

(57) ABSTRACT

Input device attachment techniques are described. In one or more implementations, a device includes a portion (e.g., an input portion or cover) is configured to be positioned over a display device of a computing device to cover the display device. The device also includes a spine (e.g., a mid-spine) that is physically attached to the portion in a manner that supports rotational movement of the portion in relation to the display device. The physical attachment of the spine is configured to be removable using a magnetic coupling between the spine and a surface of the computing device that includes the display device.

20 Claims, 11 Drawing Sheets

(51) Int. Cl.
*H04B 1/38* (2015.01)
*H04B 1/3888* (2015.01)

(52) U.S. Cl.
CPC .......... *G06F 1/1669* (2013.01); *G06F 1/1681* (2013.01); *G06F 1/1683* (2013.01); *H04B 1/3888* (2013.01); *H04M 1/0212* (2013.01); *H04M 1/0214* (2013.01); *H04M 1/0218* (2013.01)

(56) References Cited

U.S. PATENT DOCUMENTS

| | | | | |
|---|---|---|---|---|
| 8,599,542 | B1* | 12/2013 | Healey | G06F 1/1626 345/168 |
| 9,497,300 | B2 | 11/2016 | Longo et al. | |
| 2004/0005184 | A1 | 1/2004 | Kim et al. | |
| 2008/0151478 | A1 | 6/2008 | Chern | |
| 2011/0147398 | A1 | 6/2011 | Ahee et al. | |
| 2012/0066865 | A1* | 3/2012 | Lauder | G06F 1/1626 16/382 |
| 2012/0194448 | A1 | 8/2012 | Rothkopf | |
| 2013/0229354 | A1 | 9/2013 | Whitt, III et al. | |
| 2013/0277529 | A1 | 10/2013 | Bolliger | |
| 2014/0075214 | A1* | 3/2014 | Spollen | G06F 1/1662 713/300 |
| 2014/0247548 | A1* | 9/2014 | Sharma | G06F 1/1626 361/679.27 |
| 2015/0055284 | A1* | 2/2015 | Han | G06F 1/1616 361/679.12 |
| 2015/0141092 | A1* | 5/2015 | Murauyou | G06F 1/1681 455/575.8 |
| 2015/0281413 | A1 | 10/2015 | Longo et al. | |
| 2017/0075391 | A1 | 3/2017 | Longo et al. | |
| 2017/0269638 | A1* | 9/2017 | Chen | G06F 1/1616 |

FOREIGN PATENT DOCUMENTS

| | | |
|---|---|---|
| CN | 203038154 U | 7/2013 |
| CN | 203397256 U | 1/2014 |
| JP | 2004038950 A | 5/2003 |
| JP | 2010218102 A | 9/2010 |
| JP | 2012529719 A | 11/2012 |
| RU | 83630 U1 | 6/2009 |
| WO | WO-2013158110 | 10/2013 |
| WO | 2014088617 A2 | 6/2014 |

OTHER PUBLICATIONS

"International Preliminary Report on Patentability", Application No. PCT/US2015/022350, dated Mar. 4, 2016, 7 pages.

"International Search Report and Written Opinion", Application No. PCT/US2015/022350, dated Jun. 8, 2015, 11 Pages.

"KeyFolio Pro™ for iPad Air", Retrieved From:<http://www.kensington.com/kensington/us/us/s/3478/keyfolio-pro%E2%84%A2-for-ipad-air.aspx#.UxYF5PldV8F> Feb. 26, 2014, Dec. 15, 2013, 2 Pages.

"Non-Final Office Action", U.S. Appl. No. 14/229,466, dated Nov. 18, 2015, 14 pages.

"Notice of Allowance", U.S. Appl. No. 14/229,466, dated Jul. 15, 2016, 8 pages.

"QODE Ultimate Keyboard Case for iPad (4th & 3rd gen) and iPad 2", Available at: <http://www.belkin.com/us/p/P-F5L149/>, Mar. 28, 2013, 8 pages.

Hahn,"FreedomCase, the Adjustable Stand and Protective Case for Microsoft Surface Tablets with Patent-Pending Folding Design, Launches Pre-Orders on Kickstarter", Retrieved From: <http://www.prweb.com/releases/2014/02/prweb11583725.htm> Mar. 3, 2014, Feb. 8, 2014, 4 Pages.

Stark,"Review: Logitech Ultrathin Keyboard Cover for iPad", Retrieved From: <http://www.gadgetguy.com.au/product/logitech-ultrathin-keyboard-cover-for-ipad/> Feb. 26, 2014, Jun. 8, 2012, 4 Pages.

"Non-final Office Action Issued in U.S Appl. No. 15/345,233", dated Sep. 21, 2017, 9 Pages.

"Final Office Action Issued in U.S Appl. No. 15/345,233", dated Jan. 26, 2018, 12 Pages.

"Non Final Office Action Issued in U.S. Appl. No. 15/345,233", dated Jul. 18, 2018, 11 Pages.

"First Office Action Issued in Chinese Patent Application No. 201580017030.6", dated Oct. 22, 2018, 14 Pages.

"Notice of Allowance Issued in Japanese Patent Application No. 2016-559250", dated Jul. 31, 2018, 6 Pages.

"Office Action issued in Russian Patent Application No. 2016138283", dated Oct. 25, 2018, 9 Pages.

"Non Final Office Action Issued in U.S. Appl. No. 15/345,233", dated Jun. 7, 2019, 14 Pages.

"Second Office Action Issued in Chinese Patent Application No. 201580017030.6", dated Mar. 4, 2019, 11 Pages.

* cited by examiner

INPUT DEVICE ATTACHMENT

RELATED APPLICATIONS

This application is a continuation of and claims priority to U.S. patent application Ser. No. 14/229,466 filed Mar. 28, 2014 entitled "Input Device Attachment", the disclosure of which is incorporated by reference herein in its entirety.

BACKGROUND

Mobile computing devices have been developed to increase the functionality that is made available to users in a mobile setting. For example, a user may interact with a mobile phone, tablet computer, or other mobile computing device to check email, surf the web, compose texts, interact with applications, and so on.

Because mobile computing devices are configured to be mobile, however, the devices may be utilized in a wide variety of settings. Accordingly, devices were developed to help protect the mobile computing devices from their environment as well as support interaction with the device in these settings. However, conventional techniques to install and remove the devices from the computing device could be difficult to utilize and may limit some user interactions.

SUMMARY

Input device attachment techniques are described. In one or more implementations, a device includes a portion (e.g., an input portion or cover) is configured to be positioned over a display device of a computing device to cover the display device. The device also includes a spine (e.g., a mid-spine) that is physically attached to the portion in a manner that supports rotational movement of the portion in relation to the display device. The physical attachment of the spine is configured to be removable using a magnetic coupling between the spine and a surface of the computing device that includes the display device.

In one or more implementations, an input device includes an input portion configured to generate signals to be processed by a computing device and a mid-spine that is physically attached to the input portion and configured to form a removable physical coupling to be secured to a first side of the computing device that includes a display device. The input device also includes a connection portion that is physically attached the mid-spine and is configured to form a removable physical coupling to be secured to a second side of the computing device that is different than the first side and form a communicative coupling to the computing device to communicate the generated signals from the input portion.

In one or more implementations, an input device includes an input portion configured to generate signals to be processed by a computing device, a mid-spine that is physically attached to the input portion using a flexible hinge and configured to form a removable physical coupling to be secured to a first side of the computing device, and a connection portion that is physically attached the mid-spine using a flexible hinge. The connection portion is configured to form a removable physical coupling to be secured to a second side of the computing device and form a communicative coupling to the computing device to communicate the generated signals from the input portion.

In one or more implementations, a system includes a mobile computing device and an input device. The mobile computing device has a housing that is suitable to be held by one or more hands of a user, the housing including a first side that has a display device. The input device includes an input portion configured to generate signals to be processed by the computing device, a mid-spine that is physically attached to the input portion and configured to form a removable physical coupling to be secured to the first side of the computing device, and a connection portion that is physically attached the mid-spine and is configured to form a removable physical and communicative coupling to a second side of the housing of the computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

A variety of different devices may be physically attached to a mobile computing device to provide a variety of functionality. For example, a device may be configured to provide a cover for at least a display device of the computing device to protect it against harm. Other devices may also be physically attached to the mobile computing device, such as an input device (e.g., keyboard having a track pad) to provide inputs to the computing device. Further, functionality of these devices may be combined, such as to provide a combination cover and input device. However, conventional techniques that were utilized to attach devices to the computing device may lack stability in some instances and therefore limit some user interactions, such as when positioning the computing device and input device for typing on a user's lap.

Input device attachment techniques are described. In one or more implementations, the attachment techniques are configured to improve stabilization of a connection between an input device (e.g., a keyboard) and a computing device, such as a tablet computer. The input device, for instance, may include a connection portion that is configured to physically connect to a lower side of the computing device (e.g., via magnetism) and also to support a communicative coupling. A mid-spine is included between the connection portion and an input portion (e.g., having keys) to support a physical connection to a front side of the computing device, e.g., a side having a display device. The input portion may therefore gain stability from a combination of these physical connections, such as to support typing on a keyboard when positioned on a lap of a user. Further discussion of these and other techniques may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures. Further, although an input device is described, other devices are also contemplated that do not include input functionality, such as covers. For example, these techniques are equally applicable to passive devices, e.g., a cover having one or more materials (e.g., magnets, ferrous material, and so on) that are configured and positioned within the cover to be attracted to magnetic coupling devices of the computing device, use of protrusions and connecting portion, and so on as further described below.

Example Environment

Figure 1:
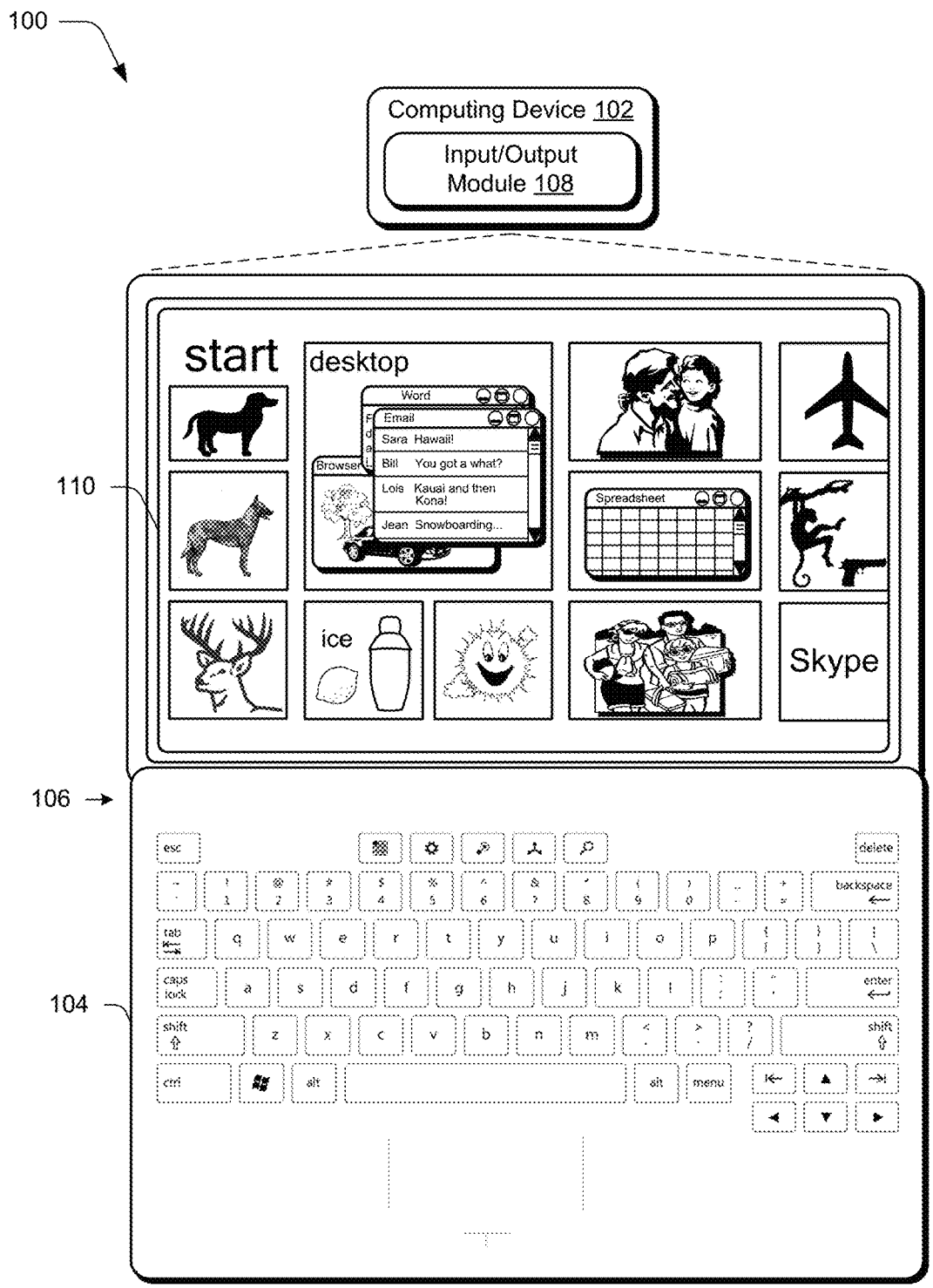
FIG. 1 is an illustration of an environment in an example implementation that is operable to employ the input device attachment techniques described herein.

FIG. 1 is an illustration of an environment 100 in an example implementation that is operable to employ the techniques described herein. The illustrated environment 100 includes an example of a computing device 102 that is physically and communicatively coupled to an input device 104 via a rotatable hinge 106. The computing device 102 may be configured in a variety of ways. For example, the computing device 102 may be configured for mobile use, such as a mobile phone, a tablet computer as illustrated, and so on. Thus, the computing device 102 may range from full resource devices with substantial memory and processor resources to a low-resource device with limited memory and/or processing resources. The computing device 102 may also relate to software that causes the computing device 102 to perform one or more operations.

The computing device 102, for instance, is illustrated as including an input/output module 108. The input/output module 108 is representative of functionality relating to processing of inputs and rendering outputs of the computing device 102. A variety of different inputs may be processed by the input/output module 108, such as inputs relating to functions that correspond to keys of the input device 104, keys of a virtual keyboard displayed by the display device 110 to identify gestures and cause operations to be performed that correspond to the gestures that may be recognized through the input device 104 and/or touchscreen functionality of the display device 110, and so forth. Thus, the input/output module 108 may support a variety of different input techniques by recognizing and leveraging a division between types of inputs including key presses, gestures, and so on.

In the illustrated example, the input device 104 has an input portion that includes a keyboard having a QWERTY arrangement of keys and track pad although other arrangements of keys are also contemplated. Further, other non-conventional configurations are also contemplated, such as a game controller, configuration to mimic a musical instrument, and so forth. Thus, the input device 104 and keys incorporated by the input device 104 may assume a variety of different configurations to support a variety of different functionality.

As previously described, the input device 104 is physically and communicatively coupled to the computing device 102 in this example through use of a rotatable hinge 106, which may be configured in a variety of ways. The rotatable hinge 106, for instance, may be flexible in that rotational movement supported by the hinge is achieved through flexing (e.g., bending) of the material forming the hinge. Other examples are also contemplated, such as a mechanical hinge that is configured to support mechanical rotation through use of a pin, a friction hinge, and so on.

This rotation may be configured to support movement in one or more directions (e.g., vertically in the figure) yet restrict movement in other directions, such as lateral movement of the input device 104 in relation to the computing device 102. This may be used to support consistent alignment of the input device 104 in relation to the computing device 102, such as to align sensors used to change power states, application states, and so on.

The rotatable hinge 106, for instance, may be formed using one or more layers of fabric and include conductors formed as flexible traces to communicatively couple the input device 104 to the computing device 102 and vice versa. This communication, for instance, may be used to communicate a result of a key press to the computing device 102, receive power from the computing device, perform authentication, provide supplemental power to the computing device 102, and so on. The rotatable hinge 106 may be configured in a variety of ways, further discussion of which may be found in relation to the following figure.

Figure 2:
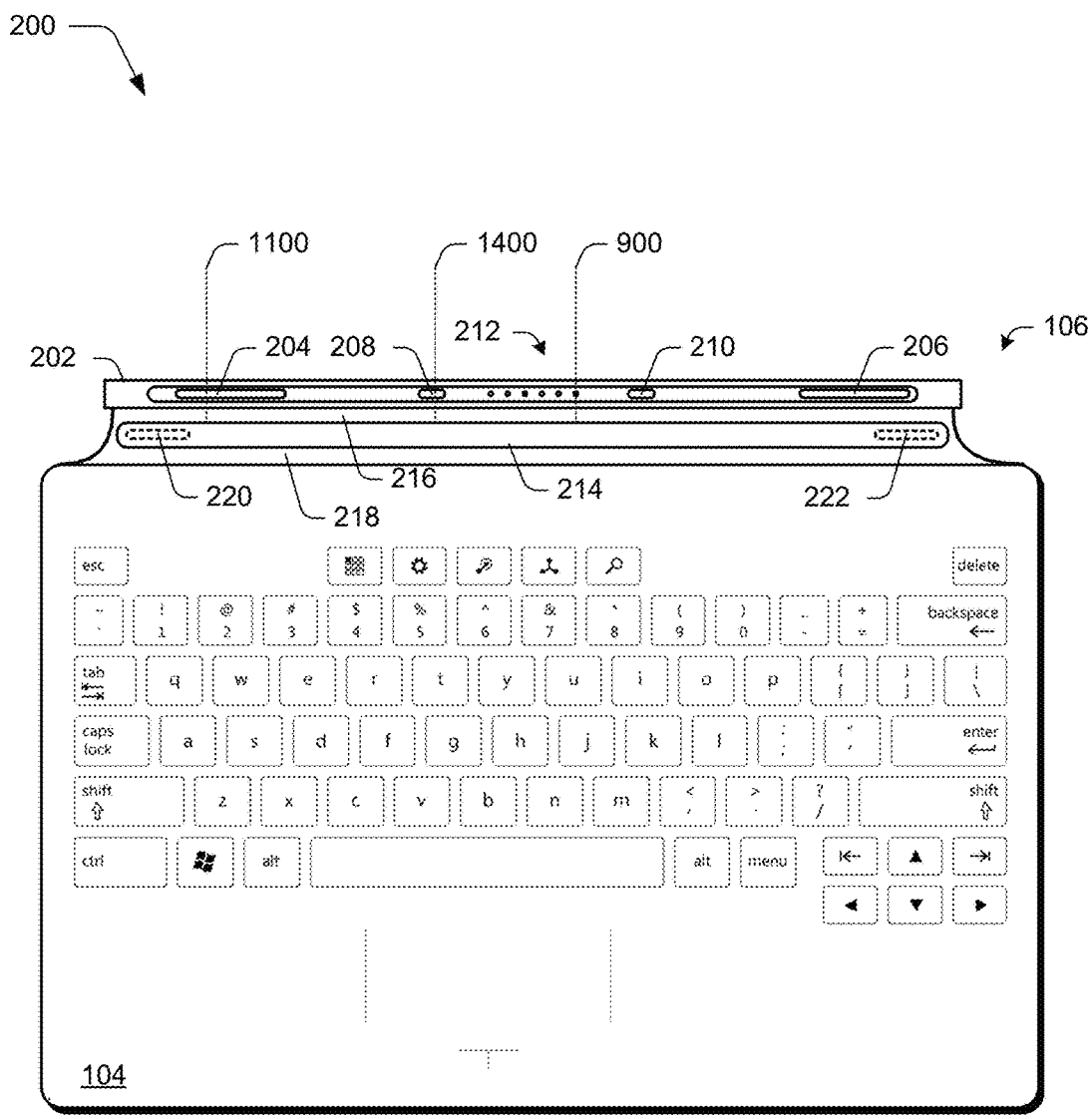
FIG. 2 depicts an example implementation of an input device of FIG. 1 as showing a rotatable hinge in greater detail.

FIG. 2 depicts an example implementation 200 of the input device 104 of FIG. 1 as showing the rotatable hinge 106 in greater detail. In this example, a connection portion 202 of the input device is shown that is configured to provide a communicative and physical connection between the input device 104 and the computing device 102. The connection portion 202 as illustrated has a height and cross section configured to be received in a channel in the housing of the computing device 102, although this arrangement may also be reversed without departing from the spirit and scope thereof.

The connection portion 202 is flexibly connected to a portion of the input device 104 that includes the keys through use of the rotatable hinge 106. Thus, when the connection portion 202 is physically connected to the computing device the combination of the connection portion 202 and the rotatable hinge 106 supports movement of the input device 104 in relation to the computing device 102 that is similar to a hinge of a book.

The connection portion 202 is illustrated in this example as including magnetic coupling devices 204, 206, mechanical coupling protrusions 208, 210, and a plurality of communication contacts 212. The magnetic coupling devices 204, 206 are configured to magnetically couple the connection portion 202 to complementary magnetic coupling devices of the computing device 102 through use of one or more magnets. In this way, the input device 104 may be physically secured to the computing device 102 through use of magnetic attraction. Other examples are also contemplated, such as mechanical examples that employ a mechanical locking mechanism, and so on.

The connection portion 202 also includes mechanical coupling protrusions 208, 210 to form a mechanical physical connection between the input device 104 and the computing device 102. The mechanical coupling protrusions 208, 210 are shown in greater detail in relation to FIG. 8.

The rotatable hinge 106 is utilized to attach an input portion (e.g., keys) of the input device 104 to the connection portion 202 as previously described. This may be performed in a variety of ways, including use of techniques to promote stabilization of the input portion of the input device 104 when in use. For example, the rotatable hinge 106 may include a mid-spine 214 that is attached to the connection portion 202 and the input portion using first and second hinges 216, 218. The hinges 216, 218 may be configured in a variety of ways, such as a flexible hinge, mechanical hinge (e.g., friction hinge, pin-based hinge), and so on.

The mid-spine 214 also includes magnetic coupling devices 220, 222 that are configured to magnetically couple the mid-spine 214 to complementary magnetic coupling devices of the computing device 102 through use of one or more magnets. In this way, the mid-spine 214 may be physically secured to the computing device 102 through use of magnetic attraction. Other examples are also contemplated, such as mechanical examples that employ a mechanical locking mechanism, and so on.

Through this rotational movement, a variety of different orientations of the input device 104 in relation to the computing device 102 may be supported. For example, rotational movement may be supported by the rotatable hinge 106 such that the input device 104 may be placed against the display device 110 of the computing device 102 and thereby act as a cover as shown in the example orientation 300 of FIG. 3. Thus, the input device 104 may act to protect the display device 110 of the computing device 102 from harm.

Figure 4:
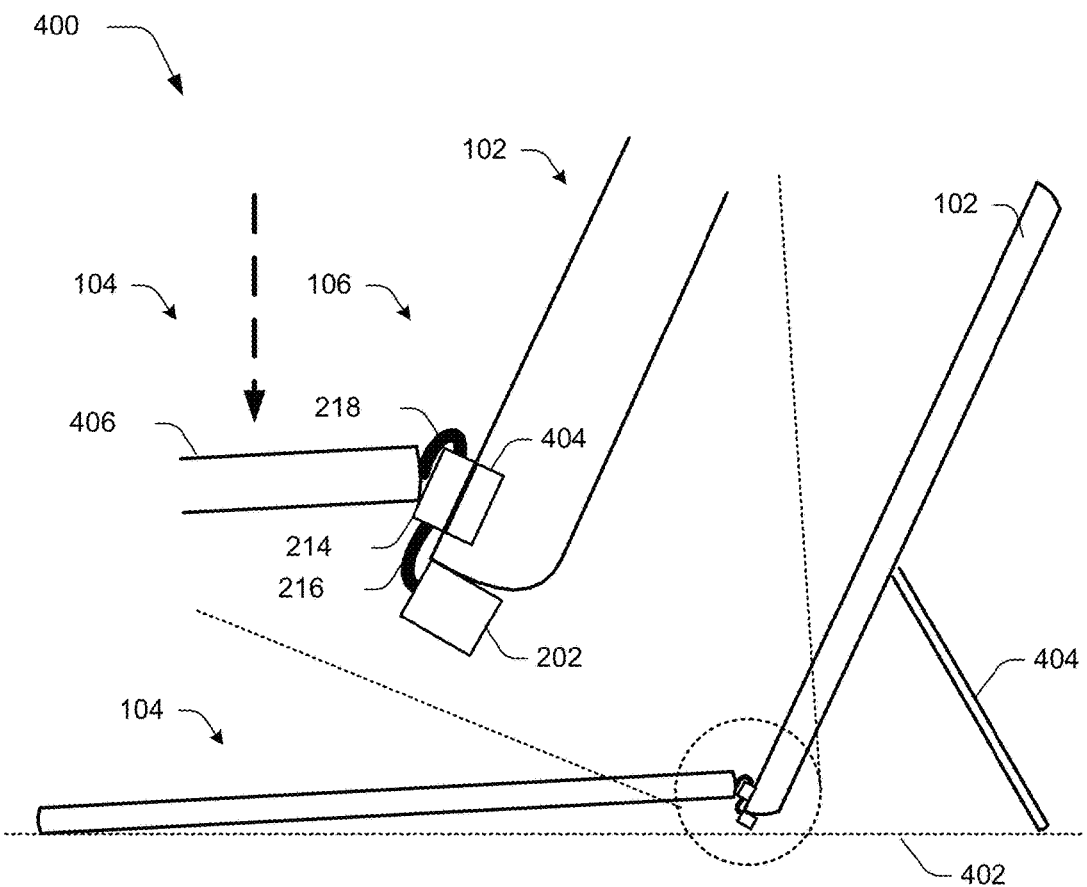
FIG. 4 depicts an example orientation of the input device in relation to the computing device as assuming a typing orientation.

As shown in the example orientation 400 of FIG. 4, a typing arrangement may be supported. In this orientation, the input device 104 is laid flat against a surface 402 and the computing device 102 is disposed at an angle to permit viewing of the display device 110, e.g., such as through use of a kickstand 404 disposed on a rear surface of the computing device 102. Although this arrangement may have success when disposed on a stable surface, this arrangement could be inconvenient using conventional techniques when disposed on an unstable surface, such as a user's lap.

Accordingly, the rotatable hinge 106 may configured such that the connection portion 202 and mid-spine 214 are disposed against different sides of the computing device 102. The connection portion 202, for instance, may be configured to form a removable physical coupling to a bottom side of the computing device 102, such as through use of the magnetic coupling device 204, 206 as described in relation to FIG. 2 and also shown in greater detail in relation to FIG. 11. This may also be used to form a communicative coupling as further described in relation to FIG. 9.

The mid-spine 214 is illustrated as forming a removable physical coupling to a second side of the computing device 102, which in this example is the front side that includes the display device 110. This removable physical coupling is implemented using a magnetic coupling device 214 that forms a physically secure connection to a complementary magnetic coupling device 404 of the computing device 102. Thus, the physical coupling between the mid-spine 214 and the connection portion 202 with the computing device 102 is removable using one or more hands of a user without using tools.

The hinge 216 in this example is flexible and bends around a corner between the two sides in this example, which is between the connection portion 202 and the mid-spine 214. The mid-spine 214 is also connected to the input portion 406 of the input device 104 using a hinge 218 that is also flexible in this instance. Rotation (e.g., via flexing in this instance) suspends the input portion 406 from the mid-spine 214.

Through suspension of the input portion 206 via the mid-spine 214, the input device 104 may have improved stabilization. For example, a force received via interaction with the input portion 406 from a user, which is illustrated as a phantom arrow in the figure, may be supported by the mid-spine 214. Thus, "play" in the rotatable hinge 106 as may be encountered using conventional techniques may be lessened and even prevented.

Although use of magnetism to support a removable physical connection and flexibility of the hinges 216, 218 has been described, a variety of other examples for implementation of the rotatable hinge 106 are also contemplated. For example, the hinges 216, 218 may be formed using a mechanical friction hinge. In this example, therefore, the mid-spine 214 may be disposed proximal to the front side of the computing device 102 without being physically secured to that side, e.g., the physical connection is provided solely by the connection portion 202 in this example. In another example, the removable physical attachment may be supported through use of a mechanical securing device, e.g., a sliding hook and slot arrangement.

Figure 5:
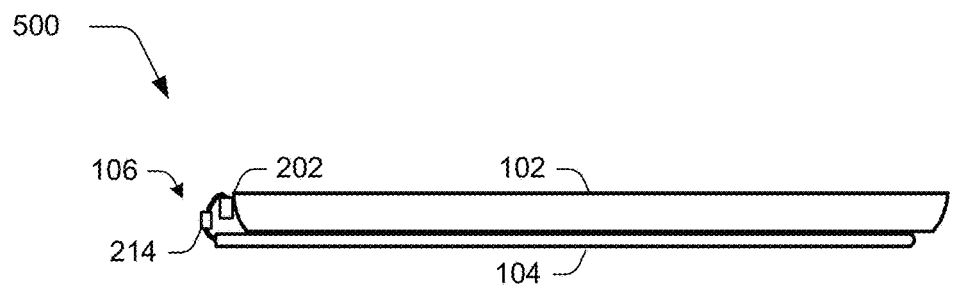
FIG. 5 depicts an example orientation of the input device in relation to the computing device as covering a rear housing of the computing device and exposing a display device of the computing device.

In the example orientation 500 of FIG. 5, the input device 104 may also be rotated so as to be disposed against a back of the computing device 102, e.g., against a rear housing of the computing device 102 that is disposed opposite the display device 110 on the computing device 102. In this example, through orientation of the connection portion 202 to the computing device 102, the rotatable hinge 106 is caused to "wrap around" the connection portion 202 to position the input device 104 at the rear of the computing device 102.

This wrapping causes a portion of a rear of the computing device 102 to remain exposed. This may be leveraged for a variety of functionality, such as to permit a camera positioned on the rear of the computing device 102 to be used even though a significant portion of the rear of the computing device 102 is covered by the input device 104 in this example orientation 500. Although configuration of the input device 104 to cover a single side of the computing device 102 at any one time was described above, other configurations are also contemplated.

Figure 6:
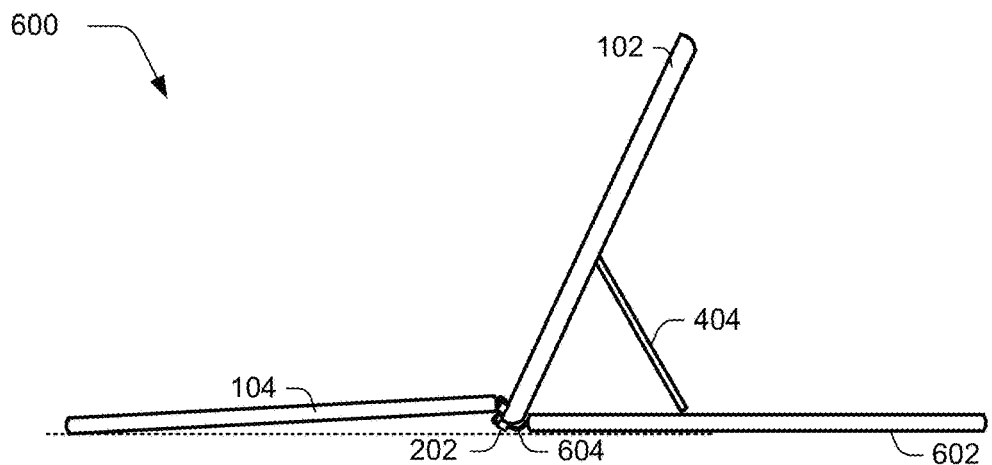
FIG. 6 depicts an example orientation of the input device as including a portion configured to cover a rear of the computing device, which in this instance is used to support a kickstand of the computing device.

In the example orientation 600 of FIG. 6, the input device 104 is illustrated as including a portion 602 configured to cover a rear of the computing device. This portion 602 is also connected to the connection portion 202 using a flexible hinge 604. This example orientation 600 also illustrates a typing arrangement in which the input device 104 is laid flat against a surface and the computing device 102 is disposed at an angle to permit viewing of the display device 110 as was previously described in relation to FIG. 4. This is supported through use of a kickstand 404 disposed on a rear surface of the computing device 102 to contact the portion 602 in this example. In one or more implementation, the input device 104 may be removably physically connected between this portion 602 and the kickstand 404, which may also be utilized to improve stability of the system. For instance, this connection may allow removal of one of the other connections, e.g., the mid-spine 214 and/or the connection portion 202.

Figure 7:
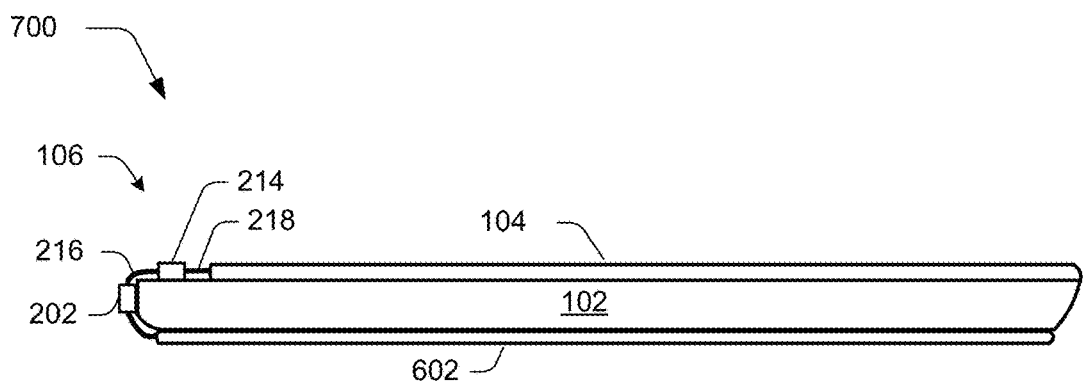
FIG. 7 depicts an example orientation in which the input device including the portion of FIG. 6 are used to cover both the front and back of the computing device.

FIG. 7 depicts an example orientation 700 in which the input device 104 including the portion 602 are used to cover both the front (e.g., display device 110) and back (e.g., opposing side of the housing from the display device) of the computing device 102. In one or more implementations, electrical and other connectors may also be disposed along the sides of the computing device 102 and/or the input device 104, e.g., to provide auxiliary power when closed.

Naturally, a variety of other orientations are also supported. For instance, the computing device 102 and input device 104 may assume an arrangement such that both are laid flat against a surface as shown in FIG. 1. Other instances are also contemplated, such as a tripod arrangement, meeting arrangement, presentation arrangement, and so forth.

Figure 8:
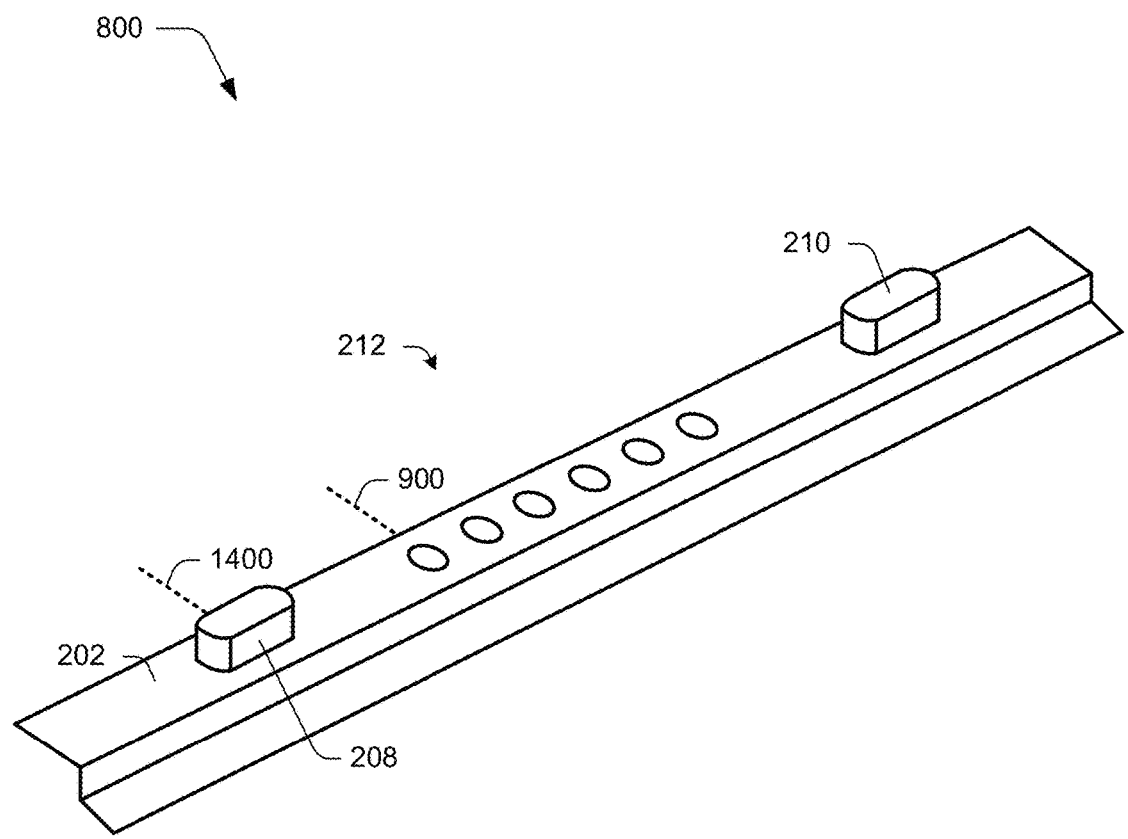
FIG. 8 depicts an example implementation showing a perspective view of a connection portion of FIG. 2 that includes mechanical coupling protrusions and a plurality of communication contacts.

FIG. 8 depicts an example implementation 800 showing a perspective view of the connection portion 202 of FIG. 2 that includes the mechanical coupling protrusions 208, 210 and the plurality of communication contacts 212. As illustrated, the mechanical coupling protrusions 208, 210 are configured to extend away from a surface of the connection portion 202, which in this case is perpendicular although other angles are also contemplated.

The mechanical coupling protrusions 208, 210 are configured to be received within complimentary cavities within the channel of the computing device 102. When so received, the mechanical coupling protrusions 208, 210 promote a mechanical binding between the devices when forces are applied that are not aligned with an axis that is defined as correspond to the height of the protrusions and the depth of the cavity, further discussion of which may be found in relation to FIG. 14.

The connection portion 202 is also illustrated as including a plurality of communication contacts 212. The plurality of communication contacts 212 is configured to contact corresponding communication contacts of the computing device 102 to form a communicative coupling between the devices as shown and discussed in greater detail in relation to the following figure.

Figure 9:
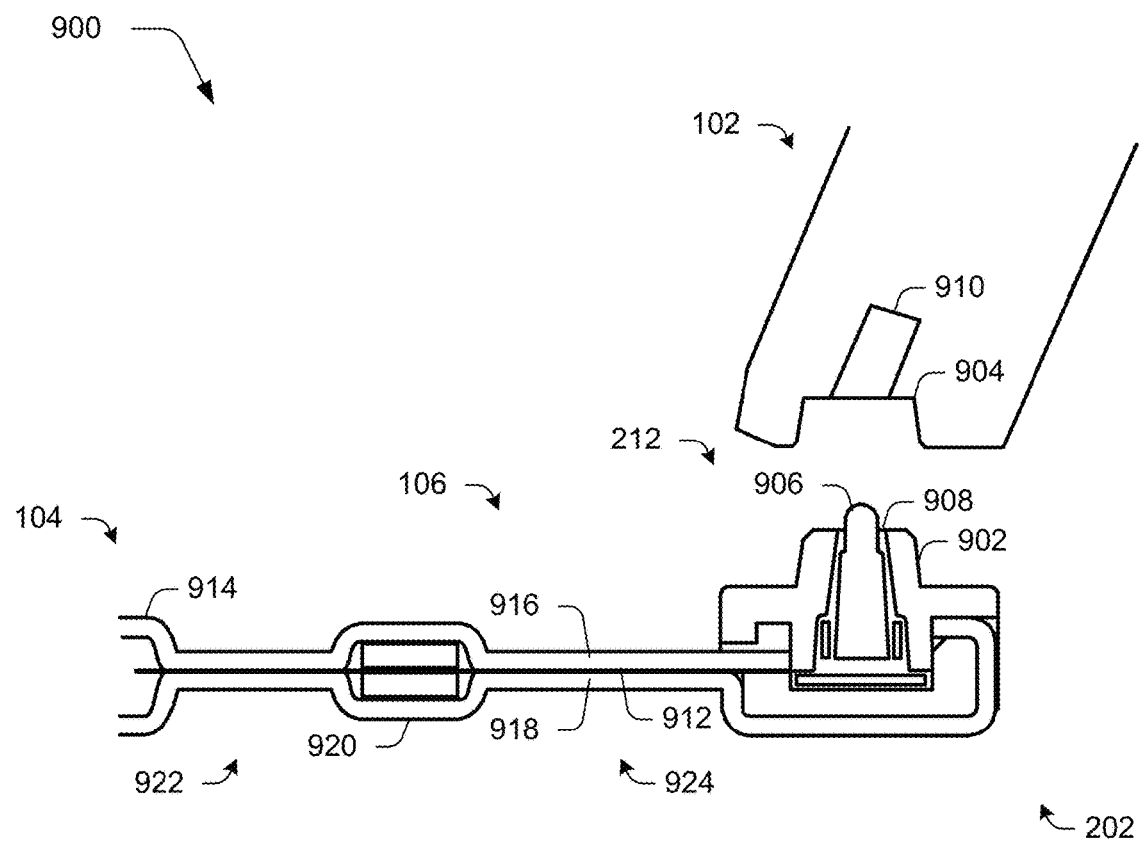
FIG. 9 depicts a cross section taken along an axis showing a communication contact as well as a cross section of a cavity of the computing device in greater detail.

FIG. 9 depicts a cross section taken along an axis 900 of FIGS. 2 and 8 showing one of the communication contacts 212 as well as a cross section of a cavity of the computing device 102 in greater detail. The connection portion 202 is illustrated as including a projection 902 that is configured to be complimentary to a channel 904 of the computing device 102, e.g., having complimentary shapes, such that movement of the projection 902 within the cavity 904 is limited.

The communication contacts 212 may be configured in a variety of ways. In the illustrated example, the communication contact 212 of the connection portion 202 is formed as a spring loaded pin 906 that is captured within a barrel 908 of the connection portion 202. The spring loaded pin 906 is biased outward from the barrel 908 to provide a consistent communication contact between the input device 104 and the computing device 102, such as to a contact 910 of the computing device 102. Therefore, contact and therefore communication may be maintained during movement or jostling of the devices. A variety of other examples are also contemplated, including placement of the pins on the computing device 102 and contacts on the input device 104.

The rotatable hinge 106 is also shown in greater detail in the example of FIG. 9. The rotatable hinge 106 in this cross section includes a conductor 912 that communicatively couples the communication contact 212 of the connection portion 202 with an input portion 914 of the input device 104, e.g., one or more keys, a track pad, and so forth. The conductor 912 may be formed in a variety of ways, such as a copper trace that has an operational flexibility to permit operation as part of the flexible hinge, e.g., to support repeated flexing of the hinge 106. Flexibility of the conductor 912, however, may be limited, e.g., may remain operational to conduct signals for flexing that is performed above a minimum bend radius.

Accordingly, the rotatable hinge 106 may be configured to support a minimum bend radius based on the operational flexibility of the conductor 912 such that the rotatable hinge 106 resists flexing below that radius. A variety of different techniques may be employed. The rotatable hinge 106, for instance, may be configured to include first and second outer layers 916, 918, which may be formed from a fabric, microfiber cloth, and so on. Flexibility of material used to form the first and/or second outer layers 916, 918 may be configured to support flexibility as described above such that the conductor 912 is not broken or otherwise rendered inoperable during movement of the input portion 914 in relation to the connection portion 202.

In another instance, the rotatable hinge 106 may include a mid-spine 920 (e.g., which may correspond to mid-spine 214 of FIG. 2) located between the connection portion 202 and the input portion 914. The mid-spine 920, for example, includes a first flexible portion 922 that flexible connects the input portion 904 to the mid-spine 920 and a second flexible portion 924 that flexible connects the mid-spine 920 to the connection portion 920.

In the illustrated example, the first and second outer layers 916, 918 extend from the input portion 914 (and act as a cover thereof) through the first and second flexible portions 922, 924 of the rotatable hinge 106 and are secured to the connection portion 202, e.g., via clamping, adhesive, and so on. The conductor 912 is disposed between the first and second outer layers 916, 918. The mid-spine 920 may be configured to provide mechanical stiffness to a particular location of the rotatable hinge 106 to support a desired minimum bend radius, further discussion of which may be found in relation to the following figure.

Figure 3:
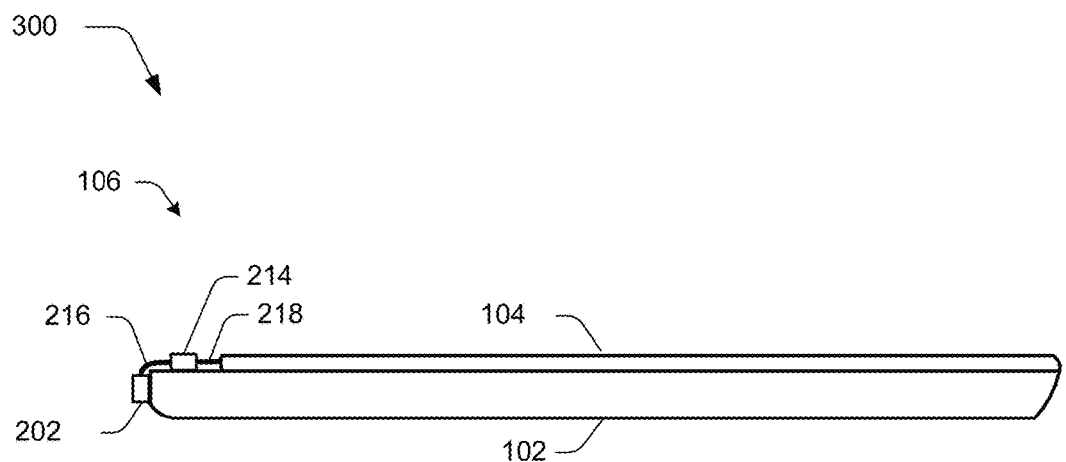
FIG. 3 depicts an example orientation of the input device in relation to the computing device as covering a display device of the computing device.
Figure 10A:
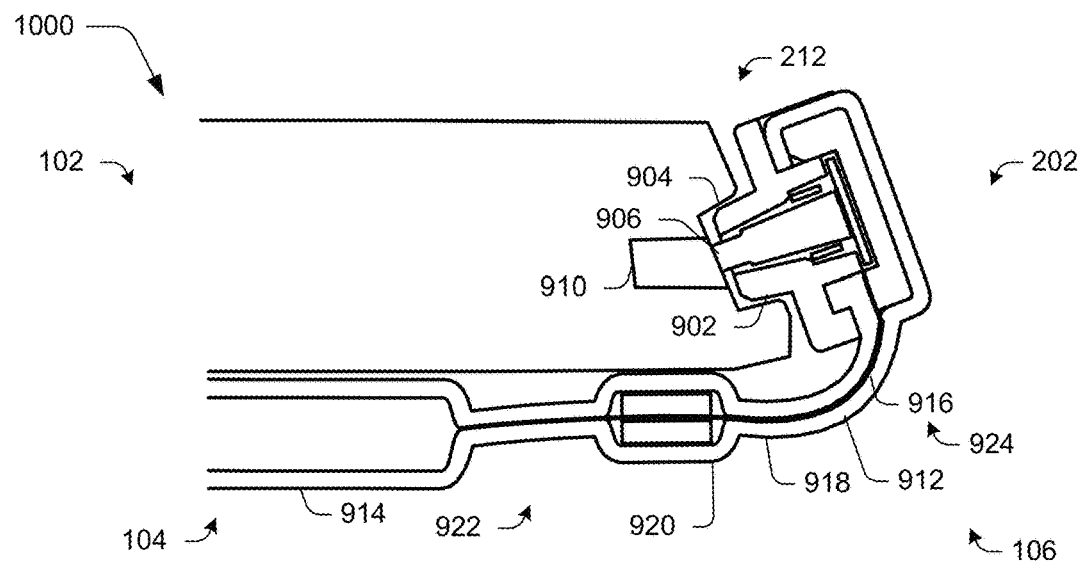
FIG. 10a depicts a cross section of the computing device, connection portion, and flexible hinge of the input device as being oriented as shown in FIG. 3 in which the input device acts as a cover for a display device of the computing device.

FIG. 10a depicts a cross section 1000 of the computing device 102, connection portion 202 and rotatable hinge 106 of the input device 104 as being oriented as shown in FIG. 3 in which the input device 104 acts as a cover for a display device 110 of the computing device 102. As illustrated, this orientation causes the rotatable hinge 106 to bend. Through sizing of the first and second flexible portions 922, 924, the bend does not exceed an operational bend radius of the conductor 912 as previously described. In this way, the mechanical stiffness may protect the conductors 912.

The mid-spine 920 may also be used to support a variety of other functionality. For example, the mid-spine 920 may support movement along a longitudinal axis as shown in FIG. 1 yet help restrict movement along a latitudinal axis that otherwise may be encountered due to the flexibility of the rotatable hinge 106.

Figure 10B:
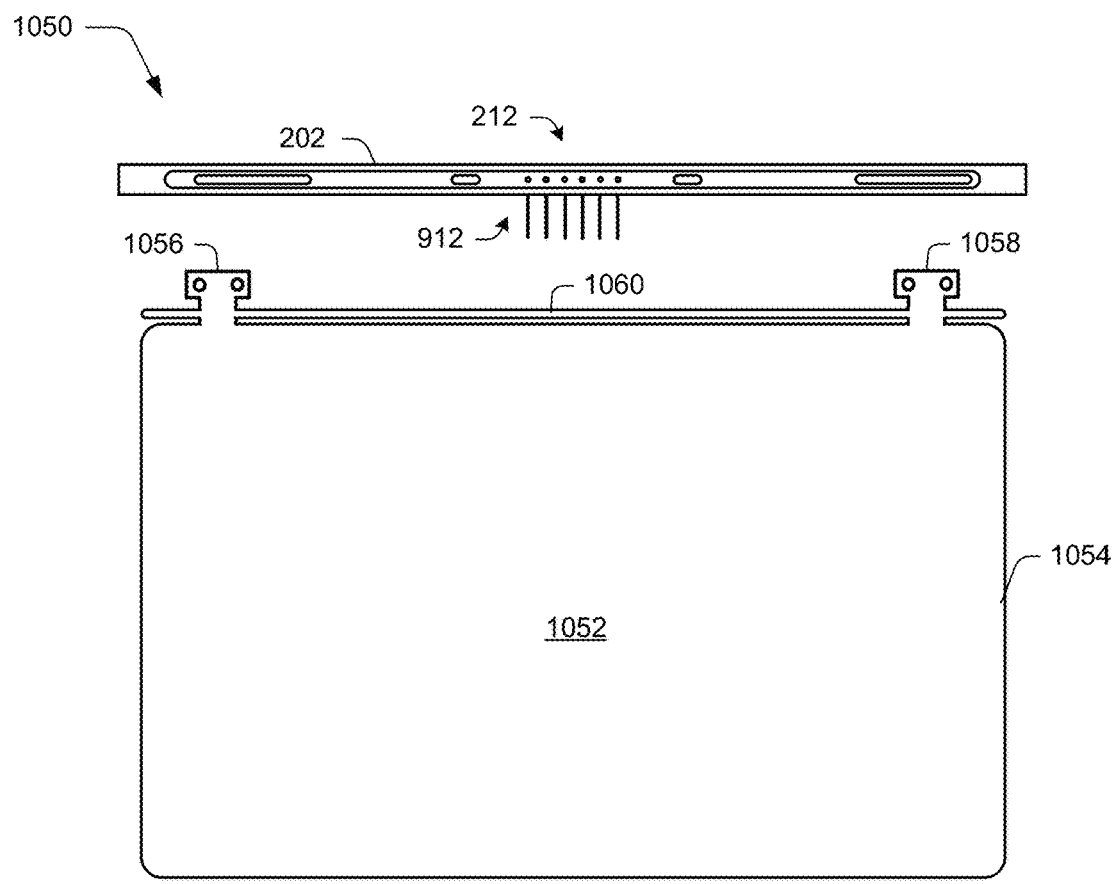
FIG. 10b depicts an example implementation showing a support layer that is configured to support operation of the flexible hinge as well as protect components of the input device during this operation.

FIG. 10b depicts an example implementation 1050 showing a support layer 1052 that is configured to support operation of the rotatable hinge 106 as well as protect components of the input device 104 during this operation. As shown in relation to FIG.s 3-7, the rotatable hinge 106 may be configured to support various degrees of bending to assume the different configurations.

However, materials chosen to form the rotatable hinge 106, such as to form the first and second outer layers 916, 918 of the rotatable hinge 106 may be chosen to support a desired "look and feel" and therefore may not provide desired resiliency against tearing and stretching. Therefore, in such an instance this could have an effect on operability of the conductors 912. For example, as previously described a user may grasp the input device 104 with one hand to pull it away from the computing device 102 by disengaging the protrusions 208 and magnetic attraction supported by the magnets. Therefore, this could result in an amount of force being applied to the conductors that is sufficient to break them absent sufficient support from the first or second outer surfaces 916, 918 or other structure.

Accordingly, the input device 104 may include a support layer 1052 that may be configured to protect the rotatable hinge 106 and other components of the input device 104. For example, the support layer 1052 may be formed of a material that has a higher resistance to tearing and stretching than a material used to form the first or second outer layers 916, 918, e.g., biaxially-oriented polyethylene terephthalate (Bo-PET) which is also known as Mylar.

Support provided by the support layer 1052 may thus help protect the material used to form the first and second outer surfaces 916, 918 of the rotatable hinge 106. The support layer 1052 may also help protect components disposed through the hinge, such as the conductors 912 used to communicatively couple the connection portion 202 with the keys.

In the illustrated example, the support layer 1052 includes a portion 1054 configured to be disposed as part of the input portion 914 of the input device 104 that includes the keys, track pad, and so on as shown in FIG. 1. The support layer 1052 also includes first and second tabs 1056, 1058 that are configured to extend from the portion 1054 through the rotatable hinge 106 to be secured to the connection portion 202. The tabs may be secured in a variety of ways, such as to include one or more holes as illustrated through which a protrusion (e.g., screw, pin, and so on) may be inserted to secure the tabs to the connection portion 202.

The first and second tabs 1056, 1058 are illustrated in this example as being configured to connect at approximate opposing ends of the connection portion 202. In this way, undesirable rotational movement may be restricted, e.g., that is perpendicular to a longitudinal axis defined by the connection portion 202. Thus, the conductors 912 disposed at a relative midpoint of the rotatable hinge 106 and connection portion 202 may also be protected from tearing, stretching, and other forces The support layer 1052 in this illustrated example also includes a mid-spine portion 1060 that is configured to form part of the mid-spine 920 that is described in relation to FIGS. 9 and 10a. Thus, the support layer 1052 may also act to increase the mechanical stiffness of the mid-spine 920 and contribute to the minimum bend radius as also previously described. Although first and second tabs 1056, 1058 are illustrated, it should be readily apparent that more or fewer tabs may also be employed by the support layer 1052 to support the functionality described.

Figure 11:
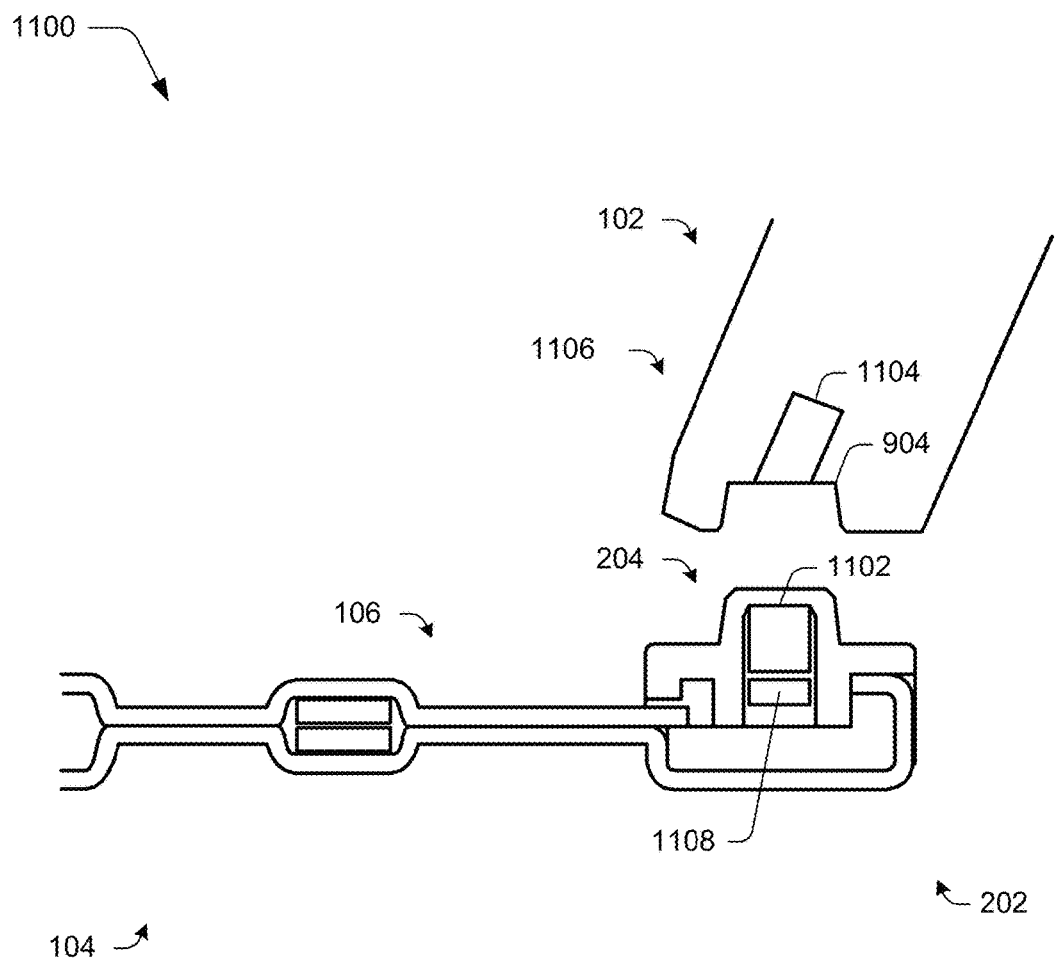
FIG. 11 depicts a cross section taken along an axis showing a magnetic coupling device as well as a cross section of the cavity of the computing device in greater detail.

FIG. 11 depicts a cross section taken along an axis 1100 of FIGS. 2 and 8 showing the magnetic coupling device 204 as well as a cross section of the cavity 904 of the computing device 102 in greater detail. In this example, a magnet of the magnetic coupling device 204 is illustrated as disposed within the connection portion 202.

Movement of the connection portion 202 and the channel 904 together may cause the magnet 1102 to be attracted to a magnet 1104 of a magnetic coupling device 1106 of the computing device 102, which in this example is disposed within the channel 904 of a housing of the computing device 102. In one or more implementations, flexibility of the rotatable hinge 106 may cause the connection portion 202 to "snap into" the channel 904. Further, this may also cause the connection portion 202 to "line up" with the channel 904, such that the mechanical coupling protrusion 208 is aligned for insertion into the cavity 1002 and the communication contacts 208 are aligned with respective contacts 910 in the channel.

The magnetic coupling devices 204, 1106 may be configured in a variety of ways. For example, the magnetic coupling device 204 may employ a backing 1108 (e.g., such as steel) to cause a magnetic field generated by the magnet 1102 to extend outward away from the backing 1108. Thus, a range of the magnetic field generated by the magnet 1102 may be extended. A variety of other configurations may also be employed by the magnetic coupling device 204, 1106, examples of which are described and shown in relation to the following referenced figure.

Figure 12:
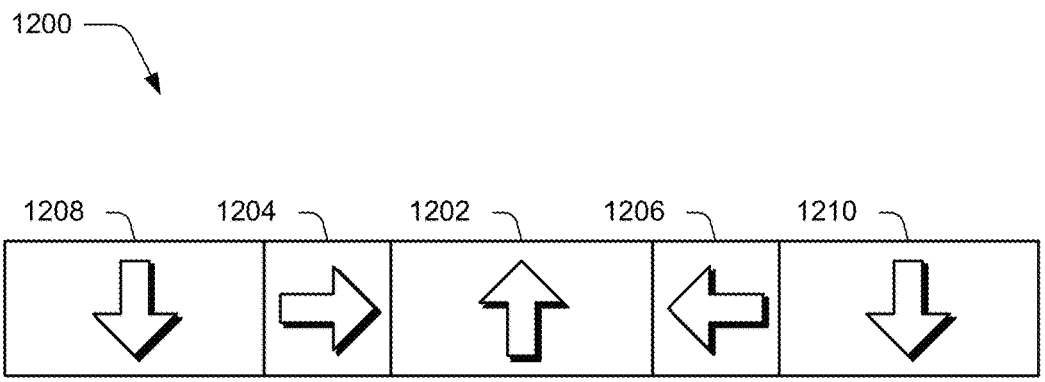
FIG. 12 depicts an example of a magnetic coupling portion that may be employed by the input device or computing device to implement a flux fountain.

FIG. 12 depicts an example 1200 of a magnetic coupling portion that may be employed by the input device 104 or computing device 102 to implement a flux fountain. In this example, alignment of a magnet field is indicted for each of a plurality of magnets using arrows. The flux fountain may be employed by the connection portion 202 and/or the mid-spine 214 of FIG. 2 to provide the removable physical coupling.

A first magnet 1202 is disposed in the magnetic coupling device having a magnetic field aligned along an axis. Second and third magnets 1204, 1206 are disposed on opposing sides of the first magnet 1202. The alignment of the respective magnetic fields of the second and third magnets 1204, 1206 is substantially perpendicular to the axis of the first magnet 1202 and generally opposed each other.

In this case, the magnetic fields of the second and third magnets are aimed towards the first magnet 1202. This causes the magnetic field of the first magnet 1202 to extend further along the indicated axis, thereby increasing a range of the magnetic field of the first magnet 1202.

The effect may be further extended using fourth and fifth magnets 1208, 1210. In this example, the fourth and fifth magnets 1208, 1210 have magnetic fields that are aligned as substantially opposite to the magnetic field of the first magnet 1202. Further, the second magnet 1204 is disposed between the fourth magnet 1208 and the first magnet 1202. The third magnet 1206 is disposed between the first magnet 1202 and the fifth magnet 1210. Thus, the magnetic fields of the fourth and fifth magnets 1208, 1210 may also be caused to extend further along their respective axes which may further increase the strength of these magnets as well as other magnets in the collection. This arrangement of five magnets is suitable to form a flux fountain. Although five magnets were described, any odd number of magnets of five and greater may repeat this relationship to form flux fountains of even greater strength.

To magnetically attach to another magnetic coupling device, a similar arrangement of magnets may be disposed "on top" or "below" of the illustrated arrangement, e.g., so the magnetic fields of the first, fourth and fifth magnets 1202, 1208, 1210 are aligned with corresponding magnets above or below those magnets. Further, in the illustrated example, the strength of the first, fourth, and fifth magnets 1202, 1208, 1210 is stronger than the second and third magnets 1204, 1206, although other implementations are also contemplated. Another example of a flux fountain is described in relation to the following discussion of the figure.

Figure 13:
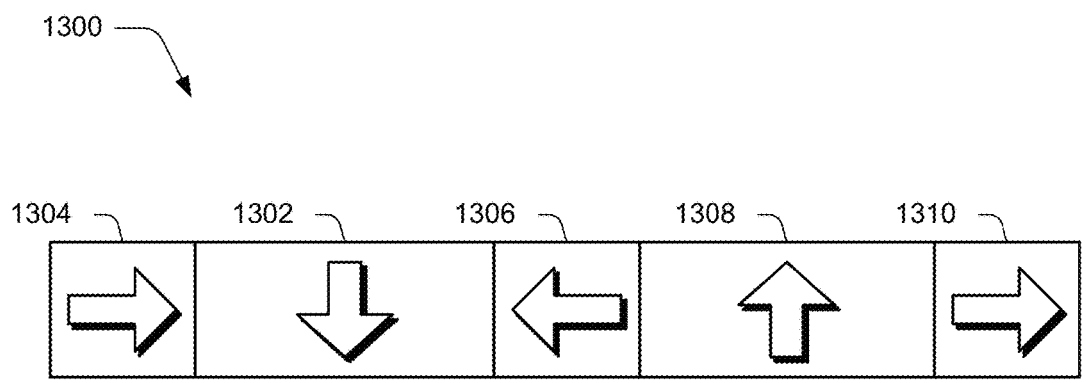
FIG. 13 depicts another example of a magnetic coupling portion that may be employed by the input device or computing device to implement a flux fountain.

FIG. 13 depicts an example 1300 of a magnetic coupling portion that may be employed by the input device 104 or computing device 102 to implement a flux fountain. In this example, alignment of a magnet field is also indicted for each of a plurality of magnets using arrows.

Like the example 1200 of FIG. 12, a first magnet 1302 is disposed in the magnetic coupling device having a magnetic field aligned along an axis. Second and third magnets 1304, 1306 are disposed on opposing sides of the first magnet 1302. The alignment of the magnetic fields of the second and third magnets 1304, 1306 are substantially perpendicular the axis of the first magnet 1302 and generally opposed each other like the example 1200 of FIG. 12.

In this case, the magnetic fields of the second and third magnets are aimed towards the first magnet 1302. This causes the magnetic field of the first magnet 1302 to extend further along the indicated axis, thereby increasing a range of the magnetic field of the first magnet 1302.

This effect may be further extended using fourth and fifth magnets 1308, 1310. In this example, the fourth magnet 1308 has a magnetic field that is aligned as substantially opposite to the magnetic field of the first magnet 1302. The fifth magnet 1310 has a magnetic field that is aligned as substantially corresponding to the magnet field of the second magnet 1304 and is substantially opposite to the magnetic field of the third magnet 1306. The fourth magnet 1308 is disposed between the third and fifth magnets 1306, 1310 in the magnetic coupling device.

This arrangement of five magnets is suitable to form a flux fountain. Although five magnets are described, any odd number of magnets of five and greater may repeat this relationship to form flux fountains of even greater strength.

Thus, the magnetic fields of the first 1302 and fourth magnet 1308 may also be caused to extend further along its axis which may further increase the strength of this magnet.

To magnetically attach to another magnetic coupling device, a similar arrangement of magnets may be disposed "on top" or "below" of the illustrated arrangement, e.g., so the magnetic fields of the first and fourth magnets 1302, 1308 are aligned with corresponding magnets above or below those magnets. Further, in the illustrated example, the strength of the first and fourth magnets 1302, 1308 (individually) is stronger than a strength of the second, third and fifth magnets 1304, 1306, 1310, although other implementations are also contemplated.

Further, the example 1200 of FIG. 12, using similar sizes of magnets, may have increased magnetic coupling as opposed to the example 1300 of FIG. 13. For instance, the example 1200 of FIG. 12 uses three magnets (e.g. the first, fourth, and fifth magnets 1202, 1208, 1210) to primarily provide the magnetic coupling, with two magnets used to "steer" the magnetic fields of those magnets, e.g., the second and third magnets 1204, 1206. However, the example 1300 of FIG. 13 uses two magnets (e.g., the first and fourth magnets 1302, 1308) to primarily provide the magnetic coupling, with three magnets used to "steer" the magnetic fields of those magnets, e.g., the second, third, and fifth magnets 1304, 1306, 1308.

Accordingly, though, the example 1300 of FIG. 13, using similar sizes of magnets, may have increased magnetic alignment capabilities as opposed to the example 1200 of FIG. 12. For instance, the example 1300 of FIG. 13 uses three magnets (e.g. the second, third, and fifth magnets 1304, 1306, 1310) to "steer" the magnetic fields of the first and fourth magnets 1302, 1308, which are used to provide primary magnetic coupling. Therefore, the alignment of the fields of the magnets in the example 1300 of FIG. 13 may be closer than the alignment of the example 1200 of FIG. 12.

Regardless of the technique employed, it should be readily apparent that the "steering" or "aiming" of the magnetic fields described may be used to increase an effective range of the magnets, e.g., in comparison with the use of the magnets having similar strengths by themselves in a conventional aligned state. In one or more implementations, this causes an increase from a few millimeters using an amount of magnetic material to a few centimeters using the same amount of magnetic material.

Figure 14:
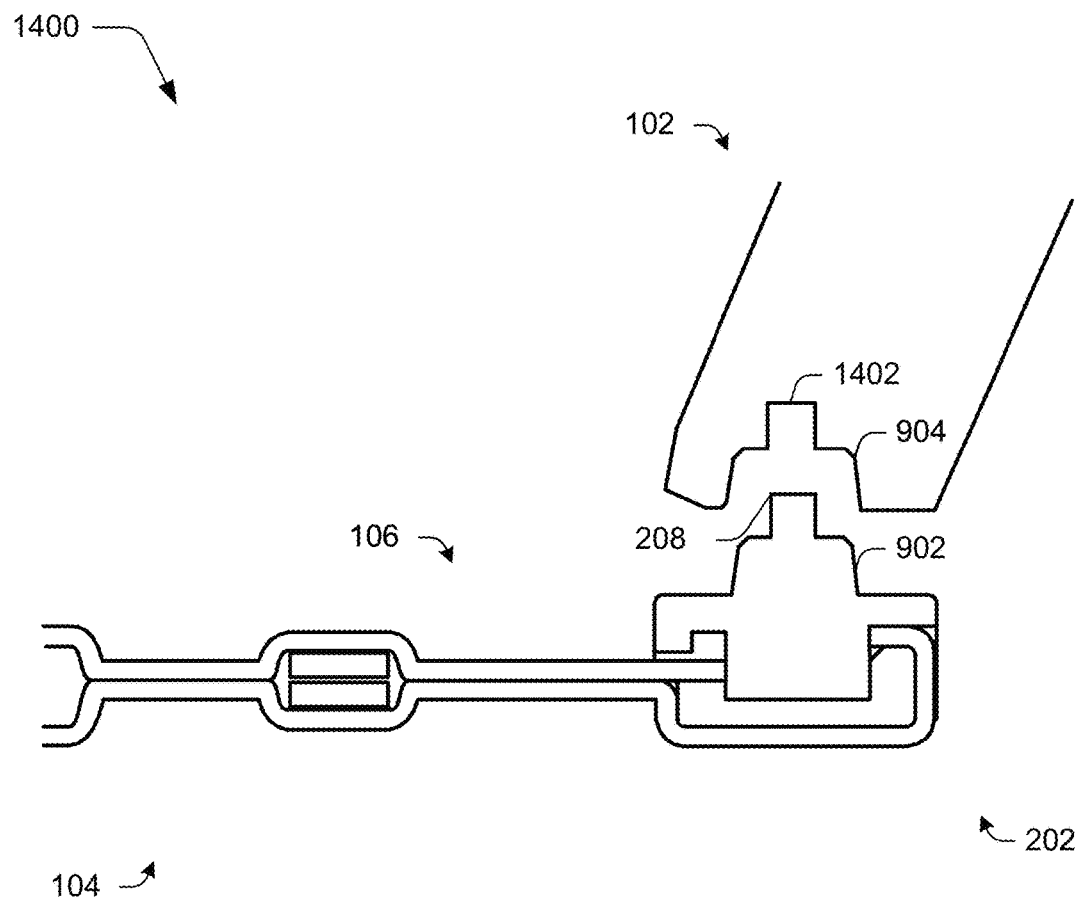
FIG. 14 depicts a cross section taken along an axis showing a mechanical coupling protrusion as well as a cross section of the cavity of the computing device in greater detail.

FIG. 14 depicts a cross section taken along an axis 1400 of FIGS. 2 and 8 showing the mechanical coupling protrusion 208 as well as a cross section of the cavity 904 of the computing device 102 in greater detail. As before, the projection 902 and channel 904 are configured to have complementary sizes and shapes to limit movement of the connection portion 202 with respect to the computing device 102.

In this example, the projection 902 of the connection portion 202 also includes disposed thereon the mechanical coupling protrusion 208 that is configured to be received in a complementary cavity 1402 disposed within the channel 904. The cavity 1402, for instance, may be configured to receive the protrusion 1002 when configured as a substantially oval post as shown in FIG. 8, although other examples are also contemplated.

When a force is applied that coincides with a longitudinal axis that follows the height of the mechanical coupling protrusion 208 and the depth of the cavity 1002 (e.g., by the hands of a user without using tools), the user overcomes the magnetic coupling force applied by the magnets solely to separate the input device 104 from the computing device 102. However, when a force is applied along another axis (i.e., at other angles) the mechanical coupling protrusion 208 is configured to mechanically bind within the cavity 1002. This creates a mechanical force to resist removal of the input device 104 from the computing device 102 in addition to the magnetic force of the magnetic coupling devices 204, 206.

In this way, the mechanical coupling protrusion 208 may bias the removal of the input device 104 from the computing device 102 to mimic tearing a page from a book and restrict other attempts to separate the devices. Referring again to FIG. 1, a user may grasp the input device 104 with one hand and the computing device 102 with another and pull the devices generally away from each other while in this relatively "flat" orientation. Through bending of the rotatable hinge 106 the protrusion 208 and an axis of the cavity 1402 may be generally aligned to permit removal.

However, at other orientations, such as those shown in FIGS. 3-7, sides of the protrusion 208 may bind against sides of the cavity 1402, thereby restricting removal and promoting a secure connection between the devices. The protrusion 208 and cavity 1402 may be oriented in relation to each other in a variety of other ways as described to promote removal along a desired axis and promote a secure connection along other axes without departing from the spirit and scope thereof.

Example System and Device

Figure 15:
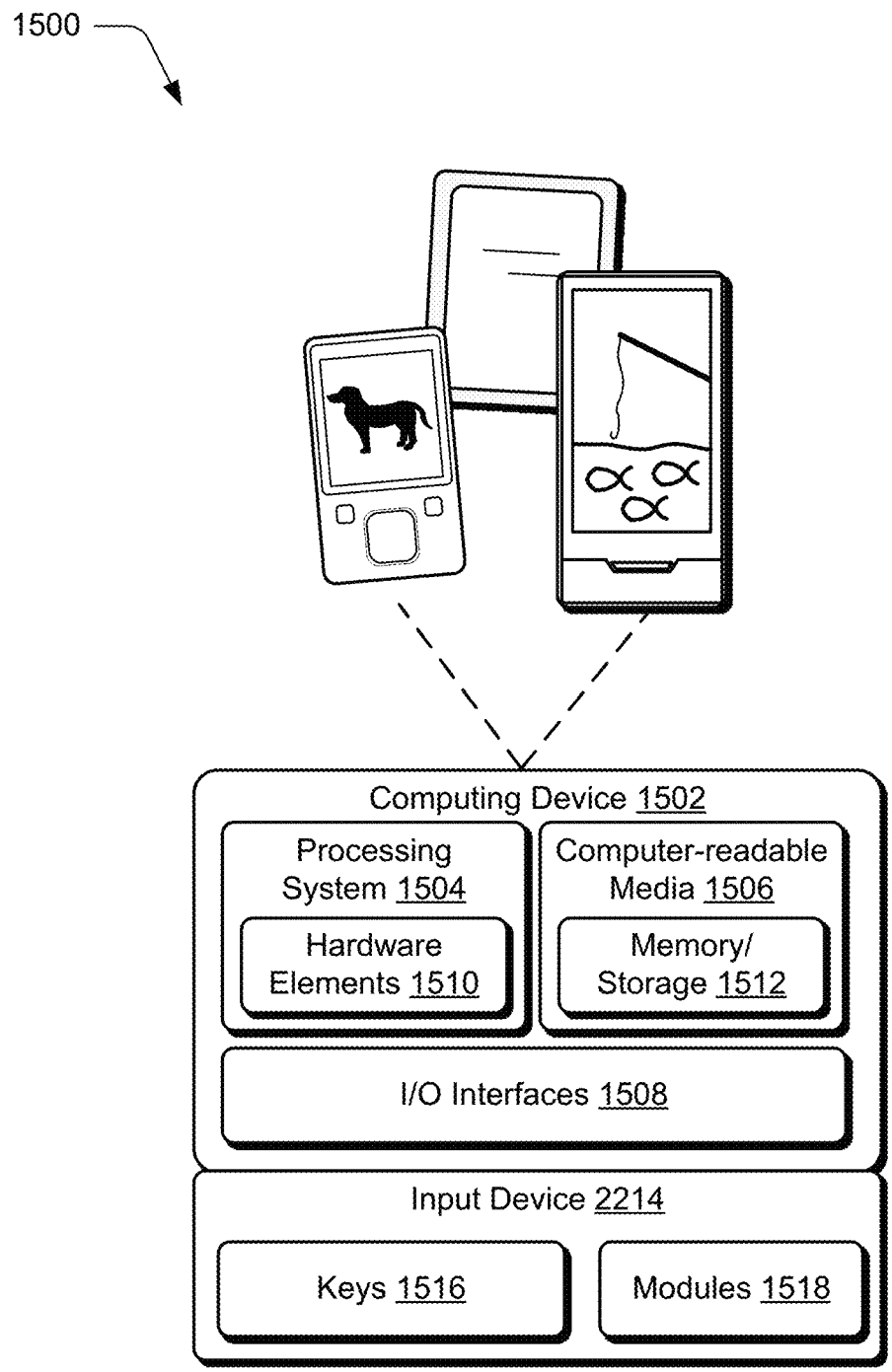
FIG. 15 illustrates an example system including various components of an example device that can be implemented as any type of computing device as described with reference to FIGS. 1-13 to implement embodiments of the techniques described herein.

FIG. 15 illustrates an example system generally at 1500 that includes an example computing device 1502 that is representative of one or more computing systems and/or devices that may implement the various techniques described herein. The computing device 1502 may be, for example, be configured to assume a mobile configuration through use of a housing formed and size to be grasped and carried by one or more hands of a user, illustrated examples of which include a mobile phone, mobile game and music device, and tablet computer although other examples are also contemplated.

The example computing device 1502 as illustrated includes a processing system 1504, one or more computer-readable media 1506, and one or more I/O interface 1508 that are communicatively coupled, one to another. Although not shown, the computing device 1502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1504 is representative of functionality to perform one or more operations using hardware. Accordingly, the processing system 1504 is illustrated as including hardware element 1510 that may be configured as processors, functional blocks, and so forth. This may include implementation in hardware as an application specific integrated circuit or other logic device formed using one or more semiconductors. The hardware elements 1510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1506 is illustrated as including memory/storage 1512. The memory/storage 1512 represents memory/storage capacity associated with one or more computer-readable media. The memory/storage component 1512 may include volatile media (such as random access memory (RAM)) and/or nonvolatile media (such as read only memory (ROM), Flash memory, optical disks, magnetic disks, and so forth). The memory/storage component 1512 may include fixed media (e.g., RAM, ROM, a fixed hard drive, and so on) as well as removable media (e.g., Flash memory, a removable hard drive, an optical disc, and so forth). The computer-readable media 1506 may be configured in a variety of other ways as further described below.

Input/output interface(s) 1508 are representative of functionality to allow a user to enter commands and information to computing device 1502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1502 may be configured in a variety of ways to support user interaction.

The computing device 1502 is further illustrated as being communicatively and physically coupled to an input device 1514 that is physically and communicatively removable from the computing device 1502. In this way, a variety of different input devices may be coupled to the computing device 1502 having a wide variety of configurations to support a wide variety of functionality. In this example, the input device 1514 includes one or more keys 1516, which may be configured as pressure sensitive keys, mechanically switched keys, and so forth.

The input device 1514 is further illustrated as include one or more modules 1518 that may be configured to support a variety of functionality. The one or more modules 1518, for instance, may be configured to process analog and/or digital signals received from the keys 1516 to determine whether a keystroke was intended, determine whether an input is indicative of resting pressure, support authentication of the input device 1514 for operation with the computing device 1502, and so on.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1502. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1510 and computer-readable media 1506 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1510. The computing device 1502 may be configured to implement particular instructions and/or functions corresponding to the software and/or hardware modules. Accordingly, implementation of a module that is executable by the computing device 1502 as software may be achieved at least partially in hardware, e.g., through use of computer-readable storage media and/or hardware elements 1510 of the processing system 1504. The instructions and/or functions may be executable/operable by one or more articles of manufacture (for example, one or more computing devices 1502 and/or processing systems 1504) to implement techniques, modules, and examples described herein.

CONCLUSION

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:
1. An input device comprising:
an input portion having an upper surface;
a first flexible hinge attached to an edge of the input portion;
a magnetic spine attached to the first flexible hinge opposite the input portion, the first flexible hinge configured to rotate the magnetic spine away from the upper surface of the input portion, the magnetic spine configured to magnetically couple to a display screen side of a computing device;
a second flexible hinge attached to the magnetic spine opposite the first flexible hinge; and
a connection portion attached to the second flexible hinge opposite the magnetic spine, the second flexible hinge configured to rotate in an opposite direction from the first flexible hinge, the connection portion configured to physically couple with a second side of the computing device that is different than the display screen side while the magnetic spine is magnetically coupled to the display screen side, the input portion configured to provide user input to the computing device when the connection portion is physically coupled to the second side of the computing device.

2. The input device of claim 1, wherein the connection portion is further configured to form a communicative coupling to the computing device to communicate signals generated by the input portion to the computing device.

3. The input device of claim 1, wherein the input portion is configured to support user input to the input portion when the connection portion is physically coupled to the second side of the computing device but the magnetic spine is not magnetically coupled to the display screen side of the computing device.

4. The input device of claim 1, wherein the upper surface of the input portion includes one or more keys.

5. The input device of claim 1, wherein the upper surface of the input portion includes a track pad.

6. The input device of claim 1, wherein the first flexible hinge is further configured to rotate the upper surface of the input device toward the display screen side of the computing device such that the input portion covers the display screen side of the computing device while the magnetic spine is magnetically coupled to the display screen side.

7. The input device of claim 1, wherein the display screen side of the computing device is generally perpendicular to the second side.

8. The input device of claim 1, wherein the computing device comprises a tablet.

9. An input device comprising:
an input portion defining a first surface, the input portion including a keyboard on the first surface;
a rotatable hinge comprising:

a first hinge attached along an edge of the input portion, the first hinge configured to allow rotation of the rotatable hinge away from the first surface of the input portion;

a second hinge configured to allow rotation of the rotatable hinge in an opposite direction from the rotation of the first hinge; and a magnetic spine between the first hinge and the second hinge, the magnetic spine being configured to magnetically couple to a display screen side of a computing device; and a connection portion configured to form a physical coupling with the computing device, the connection portion being attached to the second hinge.

10. The input device of claim 9, wherein the first hinge and the second hinge are flexible.

11. The input device of claim 10, wherein the physical coupling comprises a magnetic coupling.

12. The input device of claim 10, wherein the physical coupling comprises a mechanical coupling.

13. The input device of claim 12, wherein the connection portion includes at least one mechanical coupling protrusion configured to form the mechanical coupling with the computing device.

14. A system comprising:

a computing device having a display surface; and an input device, the input device comprising:

an input portion defining a first surface, the input portion including a keyboard on the first surface;

a rotatable hinge comprising:

a first hinge attached along an edge of the input portion, the first hinge configured to allow rotation of the rotatable hinge away from the first surface of the input portion;

a second hinge configured to allow rotation of the rotatable hinge in an opposite direction from the rotation of the first hinge; and a magnetic structure between the first hinge and the second hinge, the magnetic structure being configured to magnetically couple to the display surface of the computing device; and a communication structure configured to communicate with the computing device.

15. The system of claim 14, wherein the communication structure is configured to communicate signals generated by the input portion to the computing device.

16. The system of claim 14, the computing device having a corresponding magnetic structure configured to magnetically attract the magnetic structure of the rotatable hinge.

17. The system of claim 16, the magnetic structure of the rotatable hinge comprising a magnetic spine.

18. The system of claim 16, the corresponding magnetic structure of the computing device comprising multiple magnetic coupling devices.

19. The system of claim 14, the computing device being a tablet computer.

20. The system of claim 19, the display surface being a touch screen.

* * * * *